(12) United States Patent
Braley

(10) Patent No.: US 8,578,661 B1
(45) Date of Patent: Nov. 12, 2013

(54) COLLAPSIBLE HOUSING STRUCTURE SYSTEM

(76) Inventor: William Braley, New London, NC (US)

( * ) Notice: Subject to any disclaimer, the term of this patent is extended or adjusted under 35 U.S.C. 154(b) by 0 days.

(21) Appl. No.: 13/267,392

(22) Filed: Oct. 6, 2011

Related U.S. Application Data

(60) Provisional application No. 61/392,112, filed on Oct. 12, 2010.

(51) Int. Cl.
*E04H 1/00* (2006.01)

(52) U.S. Cl.
USPC .................................................. 52/71; 52/79.5

(58) Field of Classification Search
USPC .................................... 52/71, 79.1, 79.5, 79.9
See application file for complete search history.

(56) References Cited

U.S. PATENT DOCUMENTS

| | | | | |
|---|---|---|---|---|
| 1,375,212 A | * | 4/1921 | Crone | 16/366 |
| 2,854,705 A | | 10/1958 | McClaran | |
| 2,883,713 A | * | 4/1959 | Zug | 52/71 |
| 2,954,007 A | * | 9/1960 | Mitchell | 119/499 |
| 4,242,846 A | * | 1/1981 | Hurd et al. | 52/71 |
| 4,467,572 A | * | 8/1984 | Somers et al. | 52/70 |
| 4,823,858 A | * | 4/1989 | Perutz | 160/135 |
| 4,964,249 A | * | 10/1990 | Payne | 52/70 |
| 5,036,634 A | * | 8/1991 | Lessard et al. | 52/79.1 |
| 5,313,747 A | | 5/1994 | Sakihara | |
| 5,400,743 A | * | 3/1995 | Buckley | 119/498 |
| 5,596,844 A | * | 1/1997 | Kalinowski | 52/79.5 |
| 5,657,583 A | * | 8/1997 | Tennant | 52/79.5 |
| D388,177 S | | 12/1997 | Murray | |
| 6,253,498 B1 | * | 7/2001 | Fanucci | 52/69 |
| 6,286,269 B1 | * | 9/2001 | Marcum | 52/79.5 |
| 6,418,672 B1 | * | 7/2002 | Hampel | 52/79.1 |
| 6,581,337 B1 | * | 6/2003 | Skov et al. | 52/79.5 |
| 6,604,328 B1 | * | 8/2003 | Paddock | 52/93.1 |
| 7,188,635 B2 | | 3/2007 | Johnson | |
| 7,552,563 B2 | * | 6/2009 | Becker | 52/79.5 |
| 7,743,781 B2 | | 6/2010 | Slaughter | |
| 8,069,820 B2 | * | 12/2011 | Anderson et al. | 119/498 |
| 2003/0230454 A1 | | 12/2003 | Morgan | |

* cited by examiner

*Primary Examiner* — William Gilbert
*Assistant Examiner* — Gisele Ford

(57) ABSTRACT

A collapsible housing system having a floor panel, a first and a second side wall panel removably attached to the floor panel and extend upwardly, a front and a back wall panel removably attached to the floor panel and extend upwardly from the floor panel, a door in the front wall panel, a triangular first upper corner panel removably attached to a top edge of the front wall panel, and a second triangular upper corner panel removably attached to a top edge of the back wall panel, roof panels removably attached to the upper corner panels and extend over the side wall panels, and a window in the side wall panels, a door window in the door, and a window in the back wall panel, wherein the panels form an enclosure and the panels are attached via a hinge mechanism.

1 Claim, 3 Drawing Sheets

COLLAPSIBLE HOUSING STRUCTURE SYSTEM

CROSS REFERENCE

This application claims priority to U.S. provisional application Ser. No. 61/392,112 filed Oct. 12, 2010, the specification of which is incorporated herein by reference in its entirety.

FIELD OF THE INVENTION

The present invention is directed to a quick-assembly collapsible house-like structure.

BACKGROUND OF THE INVENTION

The present invention is directed to a quick-assembly collapsible housing system. The system of the present invention can be used for a variety of purposes including but not limited to hunting blinds and playhouses.

SUMMARY

The present invention features a collapsible housing structure system. In some embodiments, the collapsible housing system comprises a floor panel having a first side edge, a second side edge, a third side edge, and a fourth side edge; a first side wall panel and a second side wall panel removably attached to the first side edge and the second side edge of the floor panel, respectively, via a hinge mechanism, the side wall panels extend upwardly from the floor panel; a front wall panel and a back wall panel removably attached to the third side edge and the fourth side edge of the floor panel, respectively, via a hinge mechanism, the front wall panel and the back wall panel extend upwardly from the floor panel; a door disposed in the front wall panel, the door can move between at least an open position and a closed position; a first upper corner panel removably attached to a top edge of the front wall panel via a hinge mechanism, and a second upper corner panel removably attached to a top edge of the back wall panel via a hinge mechanism, the first upper corner panel and the second upper corner panel are both triangular, wherein a pointed end of each upper corner panel points upwardly from the front wall panel and the back wall panel, respectively; a first roof panel removably attached to both the first upper corner panel and the second upper corner panel via a hinge mechanism, the first roof panel extends over the first side wall panel; a second roof panel removably attached to each the first upper corner panel, the second upper corner panel, and the first roof panel via a hinge mechanism, the second roof panel extends over the second side wall panel; and a window disposed in the first side wall panel and the second side wall panel, a door window disposed in the door, and a window disposed in the back wall panel. Wherein the floor panel, side wall panels, front wall panel, back wall panel, upper corner panels, and roof panels form an enclosure.

In some embodiments, the hinge mechanism comprises a hinge and a hinge pin. In some embodiments, the system further comprises a window cover removably attached to the windows, the window cover can move between at least an open position and a closed position respectively allowing and preventing access to the window. In some embodiments, the system further comprises a securing means for securing the window cover in the closed position.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
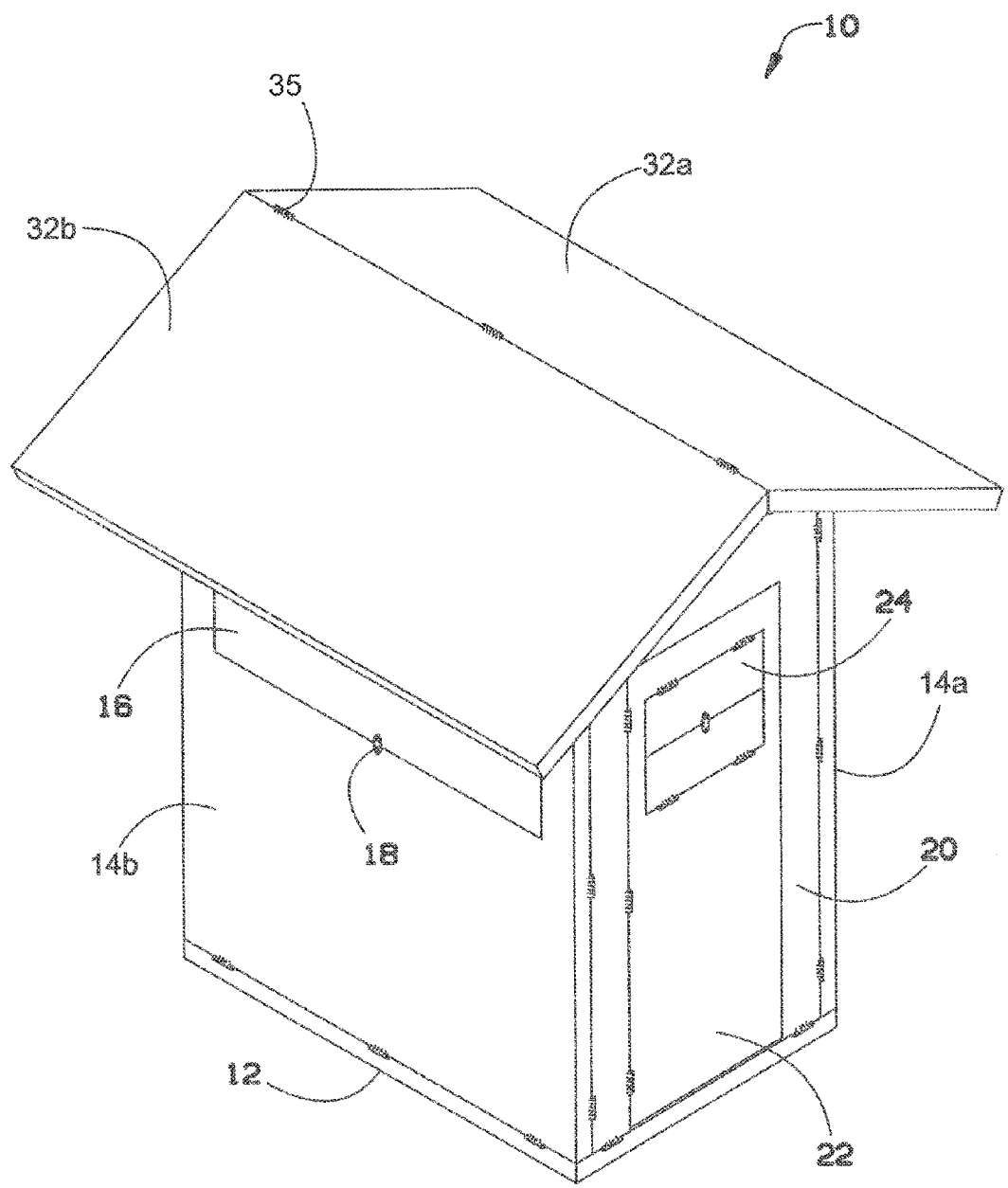
FIG. 1 is a perspective view of the system of the present invention.

Referring now to FIG. 1-5, the present invention features a collapsible housing system 10. The housing system 10 comprises a floor panel 12 with a top surface 13 having side edges, for example a first side edge 121, a second side edge 122, a third side edge 123, and a fourth side edge 124. The system 10 further comprises a first side wall panel 14a and a second side wall panel 14b. The first side wall panel 14a removably attaches to the first side edge 121 on a top surface 13 of the floor panel 12 (via one or more hinge mechanisms, e.g., a hinge 34 and hinge pin 36) and the second side wall panel 12b removably attaches to the second side edge 122 on a top surface 13 of the floor panel 12 (e.g., via one or more hinge mechanisms, e.g., a hinge 34 and hinge pin 36).

The hinge mechanism 31 comprises a hinge 34 with a hinge loop 35 and a hinge pin 36. The hinge pin connects two hinges 34 together via the hinge loops 35. The hinge pin 36 slides and inserts through the hinge loop 35. The hinge loop 35 of each hinge mechanism 31 projects outward beyond a side edge. The hinge loop 35 of the hinge mechanism 31 projects outward beyond the first side edge 121, the second side edge 122, the third side edge 123, and the fourth side edge 124 of the floor panel 12. The hinge loop 35 projects outward beyond a side edge of an outer periphery of the first side wall panel 14a, the second side wall panel 14b, the front wall panel 20, the back wall panel 28, the door 22, the first upper corner panel 26a, the second upper corner panel 26b, the first roof panel 32a, and the second roof panel 32b. The hinge loop 35 is located only on an exterior of the system 10.

In some embodiments, a window 16 is disposed in the first side wall panel 14a and/or the second side wall panel 14b. In some embodiments, a window cover 16a is removably attached to the window 16. The window cover 16a can move between at least an open position and a closed position respectively allowing and preventing access to the window. In some embodiments, the window cover 16a can be secured in the closed position via a securing means (e.g., a hasp mechanism 18, e.g., a rubber hasp mechanism). The securing means is not limited to a hasp.

The system 10 further comprises a front wall panel 20 removably attached to the third side edge 123 of the floor panel 12 and a back wall panel 28 removably attached to the fourth side edge 124 of the floor panel 12. Together, floor panel 12, the side wall panels 16, front wall panel 20, and back wall panel 28 form an enclosure.

A door 22 is disposed in the front wall panel 20. The door 22 can move between at least an open position and a closed position. In some embodiments, a door window 24 is disposed in the door 22. In some embodiments, a window 30 is disposed in the back wall panel 28.

Figure 2:
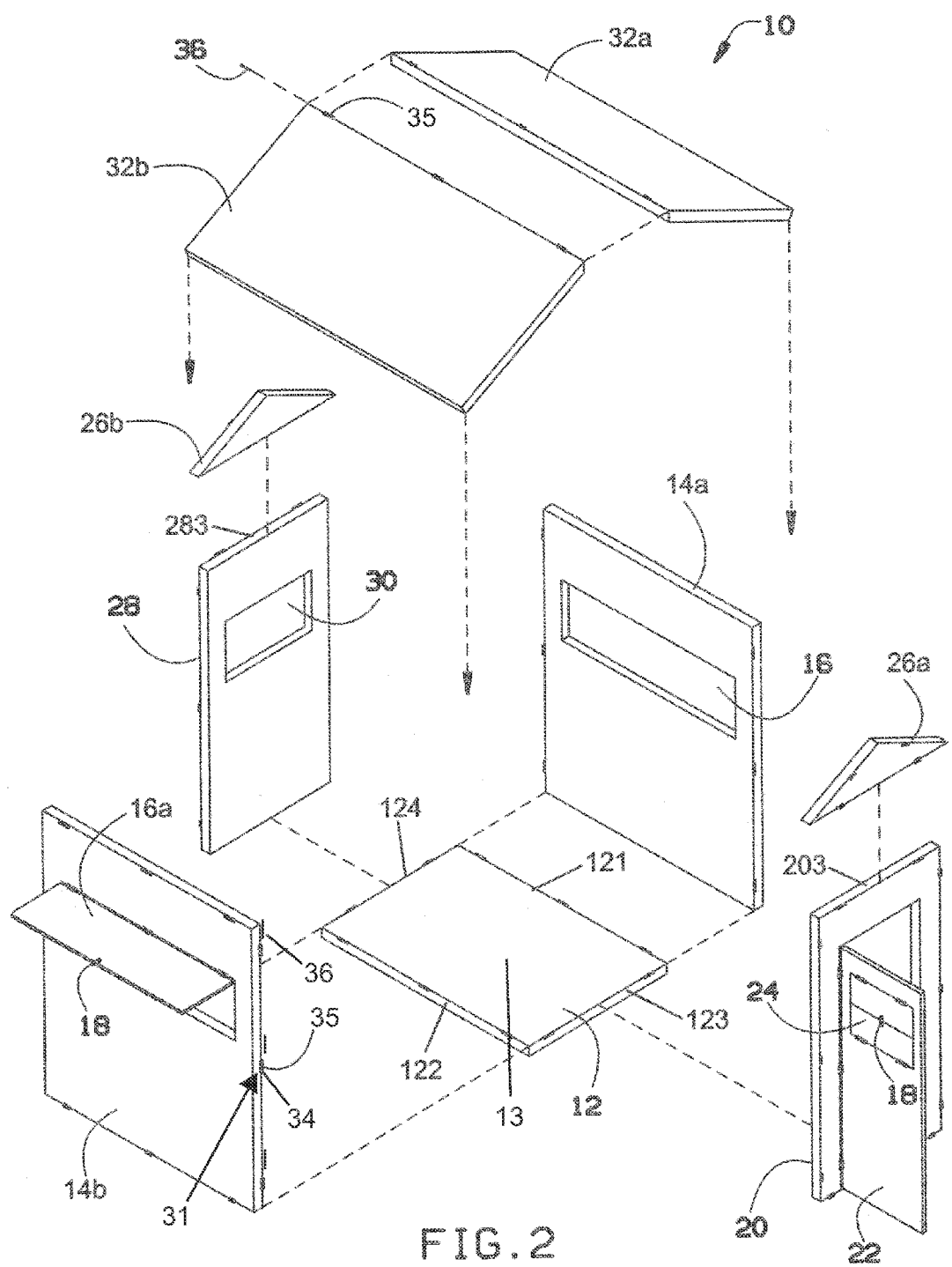
FIG. 2 is an exploded view of the system of the present invention.
Figure 3:
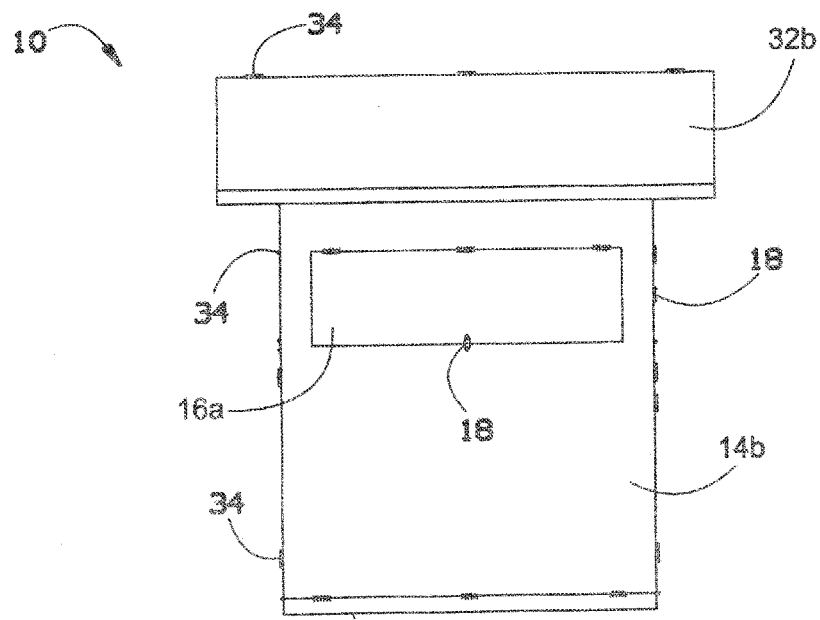
FIG. 3 is a side view of the system of the present invention.
Figure 4:
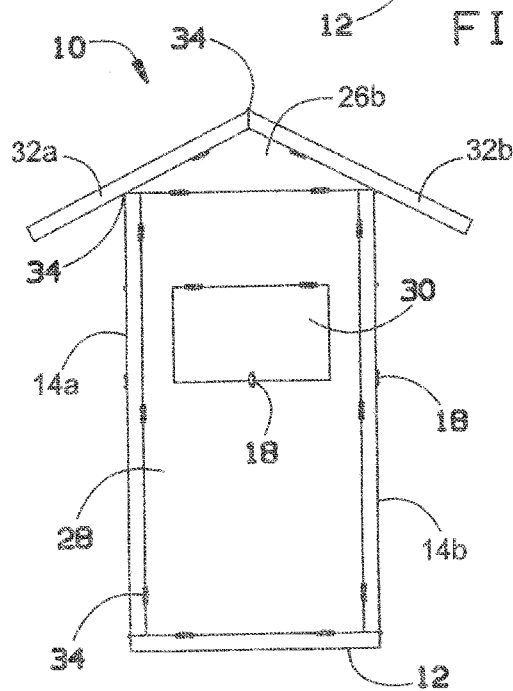
FIG. 4 is a back view of the system of the present invention.
Figure 5:
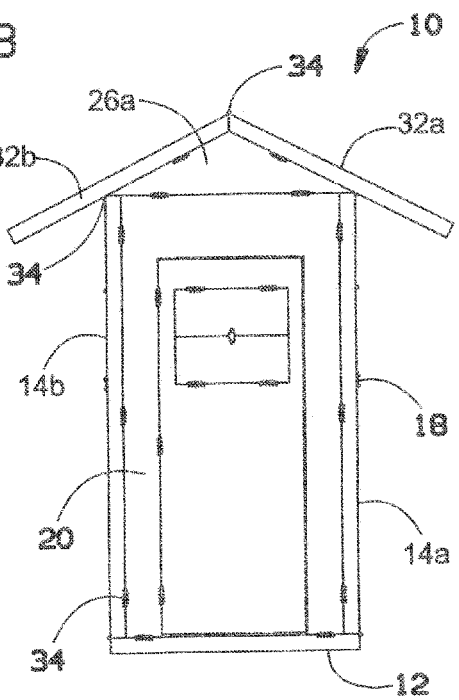
FIG. 5 is a front view of the system of the present invention.

As shown in FIG. 2, the system 10 further comprises a first upper corner panel 26a removably attached to the top edge 203 of the front wall panel 20 and a second upper corner panel 26b removably attached to the top edge 283 of the back wall panel 28. The first upper corner panel 26a and the second upper corner panel 26b are both triangular. A flat side of the upper corner panels 26 engages the front wall panel 20 and back wall panel 28 (e.g., a pointed end of the triangular upper corner panels 26 points upwardly from the wall panels 20, 28).

The system 10 further comprises a first roof panel 32a and a second roof panel 32b. The first roof panel 32a and second roof panel 32b attach atop the upper corner panels 26 to enclose the enclosure.

Without wishing to limit the present invention to any theory or mechanism, it is believed that the system 10 of the present invention is advantageous because the system 10 can be assembled quickly (e.g., about 10 minutes). The system 10 features 8 panels, allowing for easy assembly. The system 10 can accommodate longbow hunting and duck hunting. When the system 10 is disassembled it stacks compactly for storage.

The disclosures of the following U.S. patents are incorporated in their entirety by reference herein: U.S. Pat. No. 2,854,705; U.S. Pat. No. 5,313,747; U.S. Design Pat. No. D388177; U.S. Pat. No. 7,188,635; U.S. Pat. No. 7,743,781; U.S. Patent Application No. 2003/0230454.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A collapsible housing system 10 consisting of:
(a) a floor panel 12 with a top surface 13 having a first side edge 121, a second side edge 122, a third side edge 123, and a fourth side edge 124;
(b) a first side wall panel 14a and a second side wall panel 14b removably attached to the first side edge 121 and the second side edge 122 of the floor panel 12, respectively, via a hinge mechanism 31, the side wall panels 14 extend upwardly from the top surface 13 of the floor panel 12;
(c) a front wall panel 20 and a back wall panel 28 removably attached to the third side edge 123 and the fourth side edge 124 of the floor panel 12, respectively, via a hinge mechanism 31, the front wall panel 20 and the back wall panel 28 extend upwardly from the top surface 13 of the floor panel 12;
(d) a door 22 disposed in the front wall panel 20, the door 22 can move between at least an open position and a closed position;
(e) a first upper corner panel 26a removably attached to a top edge 203 of the front wall panel 20 via a hinge mechanism 31, and a second upper corner panel 26b removably attached to a top edge 283 of the back wall panel 28 via a hinge mechanism 31, the first upper corner panel 26a and the second upper corner panel 26b are both triangular, wherein a pointed end of each upper corner panel 26b points upwardly from the front wall panel 20 and the back wall panel 28, respectively;
(f) a first roof panel 32a removably attached to both the first upper corner panel 26a and the second upper corner panel 26b via a hinge mechanism 31, the first roof panel 32a extends over the first side wall panel 14a;
(g) a second roof panel 32b removably attached to each the first upper corner panel 26a, the second upper corner panel 26b, and the first roof panel 32a via a hinge mechanism 31, the second roof panel 32b extends over the second side wall panel 14b; and
(d) a window 16 disposed in the first side wall panel 14a and the second side wall panel 14b, a door window 24 disposed in the door 22, and a window 30 disposed in the back wall panel 28, wherein the floor panel 12, side wall panels 16, front wall panel 20, back wall panel 28, upper corner panels 26, and roof panels 32 form an enclosure, wherein the hinge mechanism 31 consists of a hinge 34 with a hinge loop 35 and a hinge pin 36, wherein the hinge pin 36 slidably inserts through the hinge loop 35, wherein the hinge loop 35 of each hinge mechanism 31 projects outward beyond a side edge, wherein the hinge loop 35 of the hinge mechanism 31 projects outward beyond the first side edge 121, the second side edge 122, the third side edge 123, and the fourth side edge 124 of the floor panel 12, wherein the hinge loop 35 projects outward beyond a side edge of an outer periphery of the first side wall panel 14a, the second side wall panel 14b, the front wall panel 20, the back wall panel 28, the door 22, the first upper corner panel 26a, the second upper corner panel 26b, the first roof panel 32a, and the second roof panel 32b, wherein the hinge loop 35 is disposed only on an exterior of the system 10.

* * * * *